US00RE48434E

(19) United States
(12) Reissued Patent
Shahar

(10) Patent Number: US RE48,434 E
(45) Date of Reissued Patent: Feb. 9, 2021

(54) SYSTEM AND METHOD OF PREDICTIVE INTERNET TRAFFIC STEERING

(71) Applicant: Allot LTD., Hod-Hasharon (IL)

(72) Inventor: Asaf Shahar, Kfar Saba (IL)

(73) Assignee: Allot Ltd., Hod-Hasharon (IL)

(21) Appl. No.: 16/034,030

(22) Filed: Jul. 12, 2018

Related U.S. Patent Documents

Reissue of:
(64) Patent No.: 9,391,901
Issued: Jul. 12, 2016
Appl. No.: 14/935,453
Filed: Nov. 9, 2015

U.S. Applications:
(63) Continuation of application No. 13/642,537, filed as application No. PCT/IB2011/051719 on Apr. 20, 2011, now Pat. No. 9,210,078.

(60) Provisional application No. 61/282,922, filed on Apr. 22, 2010.

(51) Int. Cl.
*H04L 12/725* (2013.01)
*H04L 12/741* (2013.01)
*H04L 12/801* (2013.01)

(52) U.S. Cl.
CPC ..... *H04L 45/306* (2013.01); *H04L 45/74* (2013.01); *H04L 47/12* (2013.01)

(58) Field of Classification Search
CPC ..... H04L 45/70; H04L 45/306; H04L 45/74; H04L 47/12
See application file for complete search history.

(56) References Cited

U.S. PATENT DOCUMENTS 8,873,556 B1 * 10/2014 Zuk ..... H04L 45/306 370/392
2003/0041168 A1 * 2/2003 Musoll ..... H04L 45/00 709/238
2003/0210694 A1 * 11/2003 Jayaraman ..... H04L 67/1008 370/392
2006/0233101 A1 10/2006 Luft et al.
2007/0061433 A1 3/2007 Reynolds et al.
2007/0206617 A1 * 9/2007 Andreasen ..... G06Q 20/102 370/401
2009/0019538 A1 1/2009 Pandya
2009/0109845 A1 4/2009 Andreasen et al.
(Continued)

OTHER PUBLICATIONS

Feb. 25, 2015—(EP) Supplementary Search Report—App 11771675.3.
Oct. 18, 2011—(PCT/IB) International Search Report—App 2011/051719.

*Primary Examiner* — Eron J Sorrell
(74) *Attorney, Agent, or Firm* — Banner & Witcoff, Ltd.

(57) ABSTRACT

System and method of predictive Internet traffic steering. An Internet steering gateway decouples between traffic classification and traffic steering, and includes: a deep packet inspection (DPI) utility to ascertain an indication of a destination remote application server (RAS) from an initial packet of a data session in a network; a RAS database to store an optimization profile for each RAS; and a steering utility to look-up, based on the RAS addressing information that was determined by the DPI utility inspection of the initial packet of the data session, an indicated RAS in the RAS database. The steering utility steers the data session to an external optimization platform (EOP) based on the associated profile in the RAS database.

26 Claims, 4 Drawing Sheets

(56) References Cited

U.S. PATENT DOCUMENTS

| | | | | |
|---|---|---|---|---|
| 2009/0150565 | A1* | 6/2009 | Grossner | G06F 9/468 709/241 |
| 2009/0285225 | A1* | 11/2009 | Dahod | H04L 12/5695 370/401 |
| 2010/0188990 | A1 | 7/2010 | Raleigh | |
| 2010/0188993 | A1* | 7/2010 | Raleigh | G06Q 10/06375 370/252 |
| 2010/0262472 | A1 | 10/2010 | Gautam et al. | |
| 2012/0127881 | A1* | 5/2012 | Wiley | H04L 67/141 370/252 |
| 2012/0134291 | A1* | 5/2012 | Raleigh | G06Q 10/06375 370/252 |
| 2012/0198061 | A1* | 8/2012 | Stenfelt | G06Q 30/02 709/224 |

* cited by examiner

Amended

SYSTEM AND METHOD OF PREDICTIVE INTERNET TRAFFIC STEERING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 9,391,901 issued Jul. 12, 2016, filed on Nov. 9, 2015 as U.S. application Ser. No. 14/935,453, which* is a Continuation of, and claims priority and benefit from, U.S. patent application Ser. No. 13/642,537, *now U.S. Pat. No. 9,210,078,* filed on Oct. 21, 2012; which was a national phase of PCT International Application Number PCT/IB2011/051719, filed on Apr. 20, 2011, published as WO 2011/132155; which in turn claims priority and benefit from U.S. Provisional Patent Application No. 61/282,922, filed on Apr. 22, 2010, all of which are hereby incorporated by reference in their entirety.

FIELD OF THE INVENTION

The present invention relates to alleviating Internet congestion generally and to doing so by predictive traffic steering in particular.

BACKGROUND OF THE INVENTION

Internet congestion is known. As Internet usage continues to increase, Internet service providers (ISPs) have experienced difficulties providing enough bandwidth to maintain acceptable levels of throughput for all users on a continual basis. One obvious solution is for the ISPs to add infrastructure to increase capacity. However, such infrastructure can be expensive, and rapid growth to keep pace with demand often leads to instability. Furthermore, even if/when an ISP manages to provide sufficient bandwidth most of the time, it may be difficult to do so during peak usage times.

When an ISP experiences excess demand for bandwidth, the simplest approach is to provide less than the demand. The decision regarding how and/or to whom to deny bandwidth can be either arbitrary or based on a variety of factors including, for example, user profiles, the amount requested, bandwidth quality, physical/logical topologies, etc.

Another approach is to actively seek to reduce the demand by implementing an external optimization platform (EOP). An EOP optimizes resource usage for a given Internet service. An EOP may use a variety of methods to optimize the video traffic, for example, transcoding and/or transrating. Transcoding includes reformatting the media content to be downloaded via the network to a different, presumably more efficient encoding technique that requires less bandwidth. For example, a media file identified as being in MPEG2 format may be converted to H264 format which requires less bandwidth for transmission while maintaining more or less the same quality.

"Transrating" entails reducing the total media content bit rate by either manipulating the frame rate, and/or reducing the number of frames without changing the encoding technique. Transrating thus effectively reduces the quality of the media stream. However as with transcoding, the extent to which it is used determines whether the reduction in quality is acceptable and/or even perceived by the end user.

In a typical EOP implementation, when Internet users attempt to open a session with an Internet service, the session is terminated by an EOP proxy server. For each intercepted Internet session, the proxy server opens a second session opposite an EOP. If the EOP recognizes the session's content as the type of data which it can optimize, then it in turn opens a session opposite the originally intended server and optimizes the received content before forwarding it to the user via the proxy server. If the EOP doesn't recognize the content, the EOP proxy server then opens a session opposite the originally intended server.

FIG. 1, to which reference is now made, illustrates an exemplary implementation 50 of a typical video traffic EOP 25. User PCs 5 attempt to connect with remote application servers (RAS) 30 via Internet 10. However, EOP proxy server 20 intercepts the connection attempts before they can continue to servers 30. Accordingly, PCs 5 do not connect directly with servers 30. Instead, the associated Internet sessions (arrows 8) are terminated by proxy server 20. Proxy server 20 then initiates a new session (arrows 40) with EOP 25 on behalf of each terminated session.

In the embodiment of FIG. 1, each PC 5 attempts to connect to a remote application server 30. PC 5A attempts to connect with video server 30A; PC 5B attempts to connect with email server 30B; and PC 5C attempts to connect with IM server 30C. EOP 25 is configured to optimize video sessions. Accordingly, when EOP proxy initiates a session with EOP 25 on behalf of PC 5A, EOP 25 recognizes the data as "relevant", i.e. "video traffic" and interacts with video server 30A to optimize the resulting data session.

EOP 25 cannot process all the incoming session data from EOP proxy server 20. For example, as per the embodiment of FIG. 1, PC 5B is attempting to connect with email server 30B and PC 5C is attempting to connect with IM server 30C. Accordingly, the sessions (arrows 40 B and C) initiated by proxy server 20 on their behalf do not contain video traffic, and EOP 25 will indicate to EOP proxy server 20 that it will not process their data. After receiving such indication, EOP proxy server will initiate new sessions opposite servers 30B and C as per the original addressing provided by PCs 5 B and C respectively.

Another typical implementation of an EOP based solution replaces EOP proxy server 20 with a traffic steering utility comprising deep packet inspection (DPI) functionality. The utility uses the DPI functionality to inspect packets from PCs 5 as they connect directly with servers 30. When session data is identified as being relevant to an EOP 25, the traffic steering utility diverts the session to the relevant EOP 25 instead of to the originally addressed server 30.

SUMMARY OF THE INVENTION

There is provided, in accordance with a preferred embodiment of the present invention, an Internet steering gateway including a deep packet inspection (DPI) utility to at least ascertain an indication of a destination remote application server (RAS) from a first packet of a data session, an RAS database to at least store an optimization profile for each of a multiplicity of the RASs, and a steering utility to steer the data session to one of at least one external optimization platform (EOP) and a RAS as per the optimization profile associated with the indication.

Further, in accordance with a preferred embodiment of the present invention, the gateway also includes means to lookup an optimization profile as per the indication.

Still further, in accordance with a preferred embodiment of the present invention, the optimization profile includes at least an indication if data traffic associated with the RAS is optimizable.

Additionally, in accordance with a preferred embodiment of the present invention, the optimization profile includes an indication of which EOP to steer the data session to for optimization.

Moreover, in accordance with a preferred embodiment of the present invention, the at least one EOP is at least two EOPs.

Further, in accordance with a preferred embodiment of the present invention, the gateway also includes an EOP database to store an EOP profile and address for at least one EOP.

Still further, in accordance with a preferred embodiment of the present invention, the DPI utility is configurable to inspect multiple the data packets to ascertain whether or not the data session is optimizable.

Additionally, in accordance with a preferred embodiment of the present invention, the gateway also includes means for associating a the optimizable data session with a the EOP profile in order to determine an appropriate the EOP for the RAS.

Moreover, in accordance with a preferred embodiment of the present invention, the gateway according to claim 1 also includes means for updating the RAS database with the RAS and an associated the optimization profile, where the associated optimization profile comprises at least an indication of a the EOP that is appropriate for customizing the data traffic associated with the RAS.

Further, in accordance with a preferred embodiment of the present invention, the at least one EOP is positioned internally within the steering gateway.

There is also provided, in accordance with a preferred embodiment of the present invention, a method for optimizing network service delivery, implementable on an Internet service gateway, the method including: inspecting a first packet of a data session with a deep packet inspection (DPI) utility, identifying a destination address for an RAS from the first packet, looking up the RAS in a RAS database as per the destination address, and for a RAS found in the RAS database, steering the data session in accordance with a profile associated with the RAS.

Still further, in accordance with a preferred embodiment of the present invention, the steering includes: steering the data session to an EOP in accordance with the profile, where the profile indicates that the data session is optimizable by the EOP.

Additionally, in accordance with a preferred embodiment of the present invention, the steering includes steering the data session to the destination address, where the profile does not indicate that the data session is optimizable by an EOP.

Moreover, in accordance with a preferred embodiment of the present invention, the method also includes inspecting a multiplicity of packets from the data session with the DPI utility, determining if the data session is optimizable, and associating the RAS with an appropriate the EOP in the associated profile.

Further, in accordance with a preferred embodiment of the present invention, the method also includes: adding a record to the RAS database for the RAS, where the RAS was not found by the looking up.

Still further, in accordance with a preferred embodiment of the present invention, the method also includes initializing the RAS database with a list of known the RASs with their associated the profiles prior to a first operation of the inspecting by the DPI utility.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
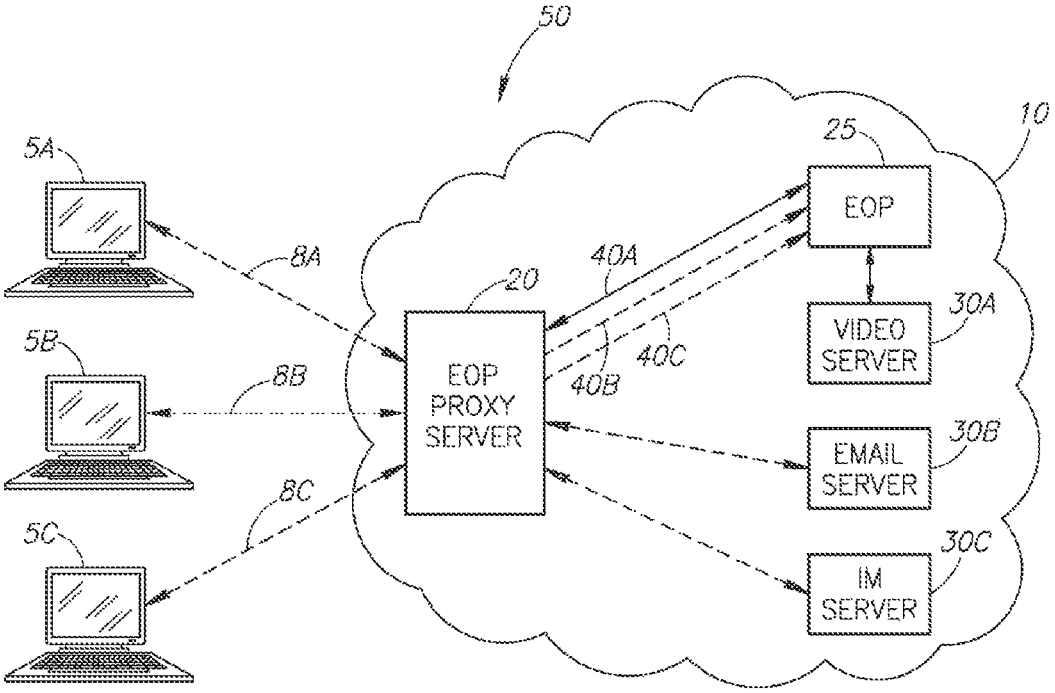
FIG.1 (PRIOR ART)
FIG. 1 is a schematic illustration of a prior art implementation of a video traffic external optimization platform (EOP) with an EOP proxy server.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The prior art suffers from many drawbacks. Proxy based EOP implementations do not scale very well. In such an implementation each Internet session is necessarily processed and likely to be terminated by the proxy server. For each such session, the proxy server initially opens a second session opposite the EOP, and possibly a third opposite the originally intended addressee if the EOP cannot process the data. Effectively, the number of sessions in the network more than doubles in a given period of time. The additional resources required for handling the increased number of sessions may negate all or most of the benefit from the bandwidth savings realized by the sessions processed by the EOP. The cost of additional required equipment to provide the required scale of operation may be more expensive than just adding bandwidth. Furthermore, there is a critical limit to the number of instantaneous sessions which can be proxied by commercially available EOP machines.

DPI aided traffic steering may have an advantage vis-à-vis proxy based solutions in that they do not entail terminating each session in the network. However, it may be necessary for the DPI to analyze several packets to "classify" the associated traffic, i.e. to establish the nature of a session's data. If so, by the time that the session is steered to the EOP, valuable information regarding the requested service may no longer be available to the EOP. As an EOP and/or the relevant application server typically require the information from the first few packets of a data session to properly set up and execute the requested service, instead of being optimized by the EOP, the service may fail altogether.

Accordingly, in order for a traffic steering DPI based solution to work reliably, the session data must be forwarded starting with the first packet of the session. Applicant has realized that by "decoupling" traffic classification and traffic steering, a background packet inspection process may be used to identify RASs in real time whose data traffic may benefit from EOP based optimization. Accordingly, by accumulating and referencing profiles of historical session data, it may generally be possible to predict whether or not a given data session may be suitable for processing by a given EOP 25. In such manner, the entire data session, including the first data packet, may be steered towards an EOP 25 for optimization.

Figure 2:
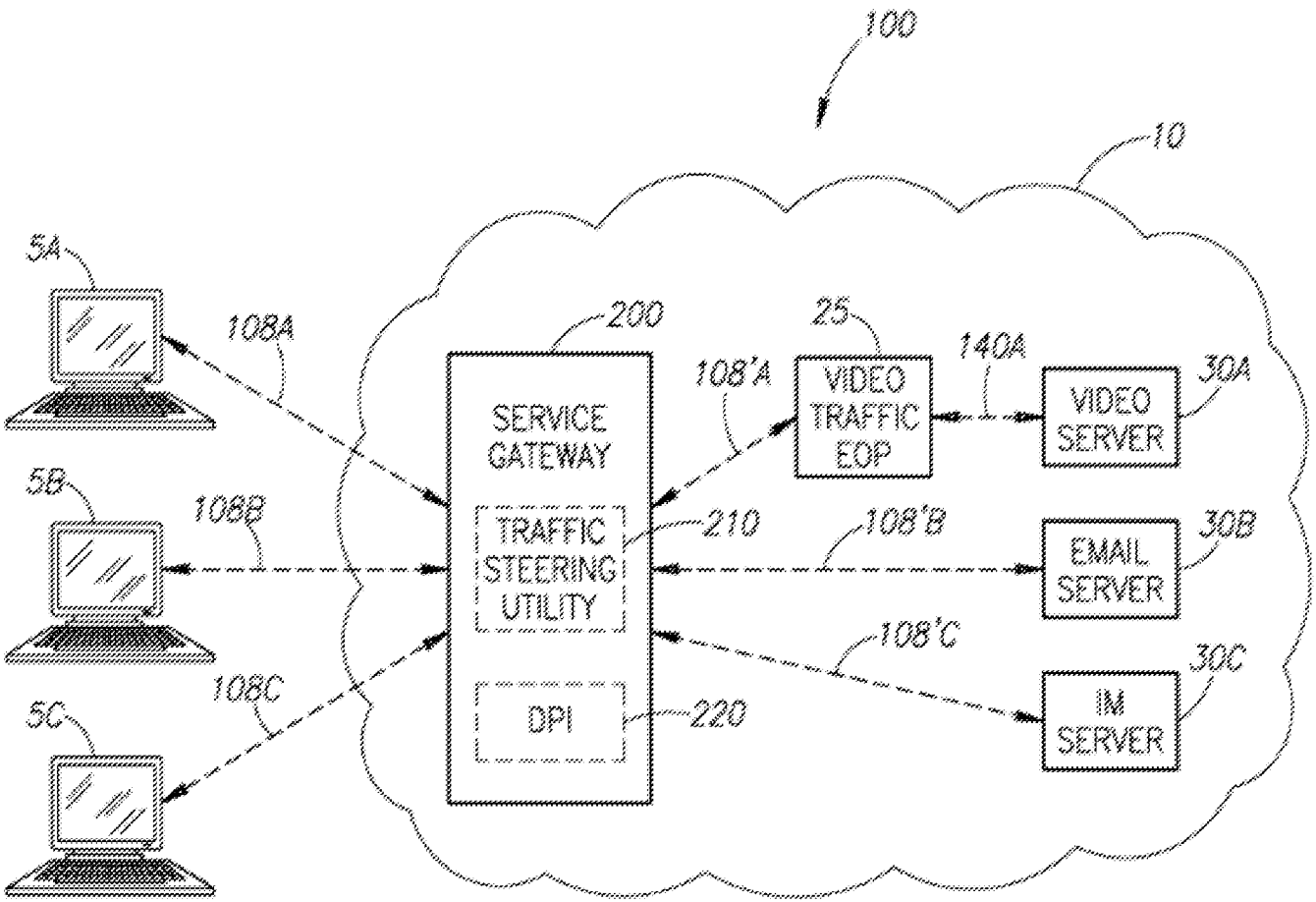
FIG. 2 is a schematic illustration of a novel predictive Internet traffic steering system, constructed and operative in accordance with a preferred embodiment of the present invention.

Reference is now made to FIG. 2 which illustrates a novel predictive Internet traffic steering system 100, constructed and operative in accordance with a preferred embodiment of the present invention. As in the prior art, PCs 5 may attempt to connect with RASs 30 via Internet 10. However, data sessions 108 pass through steering gateway 200 before continuing to RASs 30. Steering Gateway 200 may comprise traffic steering utility 210 and DPI utility 220. Traffic steering utility 210 may be any commercially available or proprietary Internet traffic steering utility such as known in the art.

In accordance with a preferred embodiment of the present invention, DPI utility 220 may provide deep packet functionality similar to that disclosed in PCT patent application PCT/IL08/000829, entitled "A DPI MATRIX ALLOCATOR", filed on Jun. 18, 2008, which is assigned to the common assignees of the present invention, and hereby disclosed in its entirety by reference. It will be appreciated, however, that DPI utility 220 may be provided by any commercially available or proprietary deep packet inspection utility such as known in the art.

DPI utility 220 may inspect the data packets of data sessions 108 as they pass through gateway 200. Traffic steering utility 210 may rely on input from utility 220 to determine how to steer continuing data sessions 108'. If, as may be disclosed hereinbelow, DPI utility 220 may indicate that a given data session 108 may benefit from EOP 25, utility 210 may steer the associated data session 108' to EOP 25 for processing. If DPI utility 220 may indicate that a data session 108 is not likely to benefit from optimization by EOP 25, utility 210 may steer continuing data session 108' directly to the originally addressed RAS 30.

Figure 3:
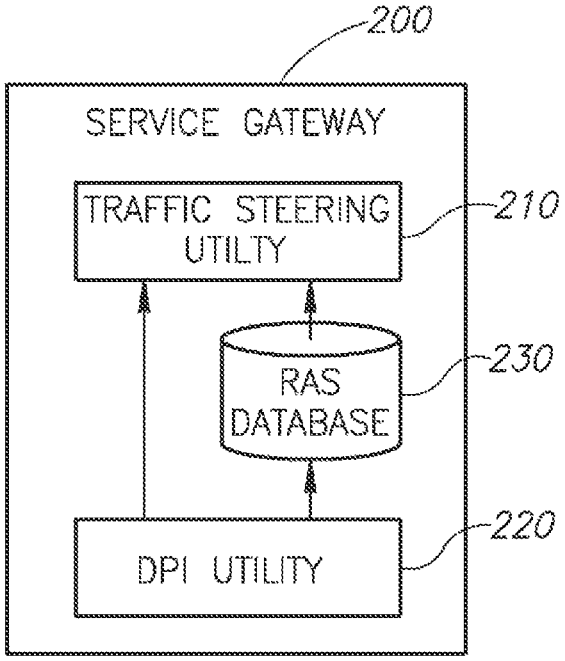
FIG. 3 is a schematic illustration of an exemplary steering gateway for the system of FIG. 2.
Figure 4:
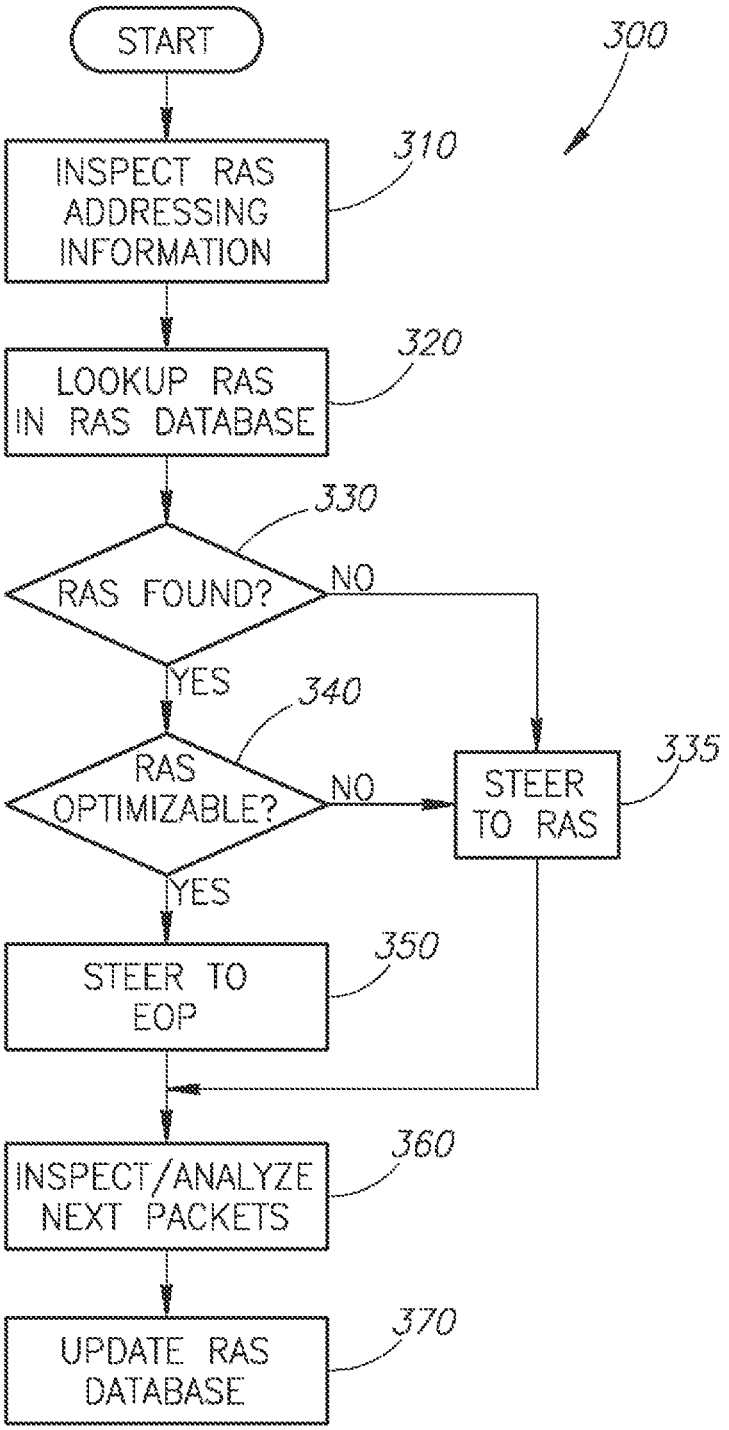
FIG. 4 is a block diagram of a process to be performed by the gateway of FIG. 3.

Reference is now made to FIG. 3 which illustrates an exemplary steering gateway 200, constructed and operative in accordance with a preferred embodiment of the present invention. As in the embodiment of FIG. 2, steering gateway 200 may comprise traffic steering utility 210 and DPI utility 220. Steering gateway may also comprise RAS database 230. As may discussed in detail hereinbelow, RAS database 230 may comprise a list of some or all RASs 30 accessed by users connecting to Internet 10 via steering gateway 200. Reference is also made to FIG. 4 which illustrates a block diagram of an exemplary predictive steering process 300 to be executed by steering gateway 200 in accordance with a preferred embodiment of the present invention.

DPI utility 220 may inspect (step 310) RAS addressing information in the first packet of each new data session passing through steering gateway 200. Such information may typically be in the form of an IP address and/or URL. Steering gateway 200 may lookup (step 320) the indicated RAS 30 in RAS database 230 as per the addressing information.

If both the relevant RAS 30 is found (step [340] *330*) and the associated profile in database 230 indicates that traffic intended for the RAS is optimizable (step 340), steering utility 210 may steer (step 350) the data session to an appropriate EOP as per the RAS profile. It will be appreciated that the embodiment of FIGS. 2 is exemplary, system 100 may be configured with multiple EOPs 25 associated with a multiplicity of RASs 30. Accordingly, RAS database 230 may associate one or more EOPs 25 for each RAS 30 associated with optimizable traffic.

If the RAS is not found (step 330) and/or if the associated profile in database 230 indicates that traffic intended for the RAS is not optimizable (step 340), steering utility 210 may steer (step 335) the data session directly to the originally addressed RAS.

It will be appreciated that in such manner an EOP 25 may only handle the specific application related traffic for which it may provide optimization services. As opposed to the prior art where an EOP 25 may be expected to process all of the network's traffic, the present invention substantially reduces the percentage of traffic that is processed by by an EOP 25. For example, in an exemplary network video traffic there may be x data sessions of which one tenth may comprise optimizable video sessions. A prior art EOP proxy server 20 may have to handle x incoming data sessions, initiate an additional x sessions to EOP 25, and then initiate another 0.9x data sessions with RASs 30 for sessions not handled by EOP 25. Accordingly, in system 50 proxy server 20 may participate in 2.9x sessions and EOP 25 may participate in x. In contrast, as implemented in system 100, steering gateway 200 may process only x data sessions and EOP 25 may participate in only 0.1x sessions.

Returning to FIG. 4, regardless of how the data session may be steered (i.e. whether via step 335 or step 350), DPI utility 220 may continue to inspect and analyze (step 360) the next several packets of the data session.

Based on the results of step 360, steering gateway 200 may update (step 370) RAS database 230. For example, if the indicated RAS 30 was not found in the lookup of step 320, gateway 200 may add a new record in database 230 with an associated profile per the addressing information of RAS 30. The profile may then be updated as per the results of step 360. If the analyzed data appears to be optimizable by an EOP 25, then the record will be updated with at least one relevant EOP 25. Accordingly, the next time a data session attempts to connect with the indicated RAS, steering gateway 200 may steer the data session to the relevant EOP 25 instead of directly to the RAS.

It will be appreciated that in such manner, database 230 may be populated over time based on the historical results of step 360. It will further be appreciated that system 100 may therefore begin operation in "learning mode" without an initial list of RAS profiles in database 230. Steering gateway 200 may simply steer all incoming data sessions to their originally addressed RASs 30 until such time as an incoming RAS 30 may be found in database 230. However, it will also be appreciated that RAS database 230 may be initialized with a list of known RAS profiles prior to the start of operation.

There may be occasions on which the results of step 370 may not match the associated profile in RAS database 230. For example, according to the profile, the data associated with the indicated RAS 30 may not be customizable, whereas the results of step 360 may indicate that the data may be customizable. Gateway 200 may be configured to update (step 370) RAS database 230 in accordance with the most recent results of step [36] *360*. Alternatively, gateway 200 may be configured wait until the results of step 360 are confirmed one or more additional times before updating database 230.

It will be appreciated that the present invention may provide benefit even if a particular EOP 25 may not require proxy functionality, i.e. the EOP functionality does not require any session termination or other proxy like functionality. In the absence of the present invention, the EOP may be required to pre-process every session in the network if it may receive a direct feed of Internet traffic with no steering or filtering. Such pre-processing may likely require an EOP to handle traffic volumes much larger than necessary, thus leading scalability issues.

It will also be appreciated that system 100 as illustrated in FIG. 2 may be exemplary. System 100 may not be limited to steering for any particular EOP 25 and/or RAS 30. Furthermore, unlike the prior art, system 100 may be configured to support a multiplicity of different EOPs 25 processing a multiplicity of different types of data traffic.

It will also be appreciated that steering gateway may comprise an EOP database (not shown) that may store details regarding EOPs 25 recognized by gateway 200. The EOP database, may, for example, store a usage profile and addressing information for EOPs 25. Gateway 200 may use the usage profile to identify an appropriate EOP for a customizable data session identified by DPI unit 220, and steering unit 210 may use the addressing information to steer the data session accordingly.

In accordance with a preferred embodiment of the present invention, steering gateway 200 may also comprise a load balancing unit (not shown) which may enable steering gateway 200 to distribute traffic among EOPs and RASs in a generally even manner. Some EOPs and/or RASs may be comprised of multiple servers operating in tandem. DPI unit 220 may forward information to the load balancing unit regarding ongoing data sessions with the individual servers components of relevant [EPOs] *EOPs* and RASs. The load balancing unit may use this information to instruct steering unit 210 in a manner such that the loads on the individual servers are generally even.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An Internet steering gateway comprising:

a memory unit *configured* to store program code;

a processor *configured* to execute said program code;

a deep packet inspection (DPI) utility *configured* to ascertain an indication of a destination remote application server (RAS) from an initial packet of a data session in a network[;], wherein the DPI utility is *configured* (A) to inspect said initial packet of said data session passing through said Internet steering gateway, *and* (B) to determine from said initial packet a RAS addressing information;

an RAS database *configured* to store an [optimization] *associated* profile for each of a multiplicity of said RASs; and a steering utility *configured* to [look-up] *lookup*, based on said RAS addressing information [that was determined by the DPI utility inspection of said initial packet of the data session], an indicated RAS in said RAS database[;], wherein [if] *when* the indicated RAS is found in said RAS database, and if [an] *the* associated profile in said RAS database indicates that traffic intended for said RAS is optimizable, then the steering utility is *configured* to steer said data session to [an] *at least one* external optimization platform (EOP) based on said associated profile in said RAS database[;], wherein [if] *when* the indicated RAS is found in said RAS database, and if the associated profile in said RAS database indicates that traffic intended for said RAS is not optimizable, then the steering utility is *configured* to steer said data session directly to [an originally-addressed] *the indicated* RAS[;], wherein [steering of said data session by] said steering utility[,] is [performed by steering] *configured to steer* said data session, starting with said initial packet of said data session, to one of *the* at least one [external optimization platform (EOP)] *EOP* and [a] *the indicated* RAS as per said [optimization] *associated* profile associated with said indication, based on predicting whether or not said data session is suitable for processing by a particular EOP, wherein said predicting [takes]

*is configured to take* into account *historical session data of the associated* profiles [of historical session data;], wherein the DPI utility is *configured* to perform deep packet inspection on [a group] *first and second groups* of multiple subsequent packets that follow said initial packet of said data session[;], wherein based on the results of the deep packet inspection of said *first* group of multiple subsequent packets, the steering utility is *configured* to update the RAS database by performing: [if] *when* the indicated RAS was not found in said [look-up] *lookup*, then the steering utility is *configured* to add a new record in said RAS database with an associated profile per said RAS addressing information[;], wherein the steering gateway is *configured* to wait until the deep packet inspection results *of the second group of multiple subsequent packets* are confirmed [at least one or more times] before updating said RAS database[;], wherein the data session is *configured to be* steered to the [external optimization platform (EOP)] *at least one EOP* via a route that excludes any proxy server and without terminating the data session in the network[;], wherein the [external optimization platform (EOP) receives] *at least one EOP is configured to receive* the data session starting from said initial packet of the data session[;], wherein the [external optimization platform (EOP) utilizes] *at least one EOP is configured to utilize* at least the content of said initial packet of the data session to perform optimization of said data session[;], wherein the Internet steering gateway is *configured* to decouple between (i) traffic classification and (ii) traffic steering.

2. The Internet steering gateway of claim 1, wherein said [optimization] *associated* profile comprises at least an indication whether or not data traffic associated with said RAS is optimizable.

3. The Internet steering gateway of claim 1, wherein said [optimization] *associated* profile comprises an indication of which particular EOP, out of a plurality of EOPs, to steer said data session to for optimization.

4. The Internet steering gateway of claim 1, wherein said at least one EOP comprises at least two EOPs selected from a plurality of [EPOs] *EOPs*.

5. The Internet steering gateway of claim 1, *further* comprising:

an EOP database *configured* to store an EOP profile and address for each EOP of a plurality of EOPs.

6. The Internet steering gateway of claim 5, wherein said DPI utility is [configurable] *further configured* to inspect multiple data packets of said data session to ascertain whether or not said data session is optimizable by a particular [EPO] *EOP* out of [a] *the* plurality of [available EPOs] *EOPs*.

7. The Internet steering gateway of claim 6, wherein the Internet steering gateway *further* is *configured* to associate said [optimizable] data session with said EOP profile of said particular [EPO] *EOP* in order to determine an appropriate [said] EOP for said RAS.

8. The Internet steering gateway of claim 1, wherein the Internet steering gateway *further* is *configured* to update said RAS database with said RAS and an associated [said optimization] profile, wherein said associated [optimization] profile comprises at least an indication of said *at least one* EOP that is appropriate for customizing [said] data traffic associated with said RAS based on inspection of a set of packets that includes at least said initial packet of said data session.

9. The Internet steering gateway of claim 1, wherein said at least one EOP is positioned internally within said *Internet* steering gateway.

10. The Internet steering gateway of claim 1, wherein the Internet steering gateway *further* comprises a load balancing unit *configured* to distribute traffic among multiple [EPOs] *EOPs* and multiple RASs [in a generally even manner].

11. The Internet steering gateway of claim 1, wherein the Internet steering gateway *further* comprises a load balancing unit *configured* to distribute traffic among multiple [EPOs] *EOPs* and multiple RASs [in a generally even manner,] based on information received from the DPI utility, wherein the information comprises information regarding ongoing data sessions with individual server components of [EPOs] *EOPs* and RASs.

12. The Internet steering gateway of claim 1, wherein the steering utility [steers] *is configured to steer* the data session, starting at the initial packet of the data session, to said *at least one* EOP to enable said *at least one* EOP to process said data session starting from its initial packet.

13. The Internet steering gateway of claim 1, wherein the steering utility is *configured* to steer the data session, starting with [its] *at the* initial packet, by selecting one option out of the following three steering options:

(A) if the indicated RAS is found in said RAS database, and if an associated profile in said RAS database indicates that traffic intended for said RAS is optimizable, then the steering utility is *configured* to steer said data session to [an external optimization platform (EOP)] *the at least one EOP* based on said associated profile in said RAS database[;], (B) if the indicated RAS is found in said RAS database, and if [the] *an* associated profile in said RAS database indicates that traffic intended for said RAS is not optimizable, then the steering utility is *configured* to steer said data session directly to an [originally-addressed] *originally addressed* RAS[;], *and*

(C) if the indicated RAS is not found in said RAS database, [and regardless of whether or not the data session is optimizable,] then the steering utility is *configured* to steer said data session directly to said [originally-addressed] *originally addressed* RAS.

14. The Internet steering gateway of claim 1, wherein data sessions remain continuous and non-terminated from end-user devices, through the Internet steering gateway, to the [external optimization platform (EOP)] *at least one EOP* that optimizes the data session starting [from its] *at the* initial packet and in a communication route that excludes any EOP proxy server.

15. A method for optimizing network service delivery, implementable on an Internet service gateway, the method comprising:

storing in a remote access server (RAS) database an [optimization] *associated* profile for each of a multiplicity of RASs;

inspecting an initial packet of a data session with a deep packet inspection (DPI) utility to ascertain an indication of a destination [remote application server (RAS)] *RAS*, by performing deep packet inspection of said initial packet [of said data session passing through said Internet service gateway,] and determining from said initial packet a RAS addressing information;

identifying a destination address for a [remote access server (RAS)] *RAS* from said [first] *initial* packet;

looking up said RAS in said RAS database as per said destination address, wherein said looking up comprises: based on said RAS addressing information, [that was determined by the DPI utility inspection of said initial packet of the data session,] looking up [an indicated] *the destination* RAS in said RAS database;

[wherein if] *when* the [indicated] *destination* RAS is found in said RAS database, and if [an] *the* associated profile in said RAS database indicates that traffic intended for said *destination* RAS is optimizable, then [the method comprises] steering said data session to an external optimization platform (EOP) based on said associated profile in said RAS database;

[wherein if] *when* the [indicated] *destination* RAS is found in said RAS database, and if the associated profile in said RAS database indicates that traffic intended for said *destination* RAS is not optimizable, then [the method comprises] steering said data session directly to [an originally-addressed] *the destination* RAS[; and],

[for said RAS found in said RAS database, steering said data session in accordance with a profile associated with said RAS,] wherein steering said data session comprises steering said data session starting with the initial packet of said data session based on predicting whether or not said data session is suitable for processing by a particular EOP, wherein said predicting takes into account *historical session data of the associated* profiles [of historical session data];

wherein the method comprises[, at said DPI utility,] performing, *at said DPI utility,* deep packet inspection on [a group] *first and second groups* of multiple subsequent packets that follow said initial packet of said data session;

based on the results of the deep packet inspection of said *first* group of multiple subsequent packets, updating the RAS database by performing: [if] *when* the indicated RAS was not found in said [looking-up] *looking up*, then adding a new record in said RAS database with an associated profile per said RAS addressing information; [wherein the method comprises]

waiting until the deep packet inspection results are confirmed [at least one or more times] *for the second group of multiple subsequent packets* before updating said RAS database;

steering the data session to the [external optimization platform (EOP)] *EOP* via a route that excludes any proxy server and without terminating the data session in the network;

[at the external optimization platform (EOP),] receiving, *at the EOP,* the data session starting from said initial packet of the data session; *and*

[at the external optimization platform (EOP),] utilizing, *at the EOP,* at least the content of said initial packet of the data session to perform optimization of said data session[;], wherein the method performs decoupling between (i) traffic classification and (ii) traffic steering.

16. The method of claim 15, wherein said steering comprises:

steering said data session, including its initial packet, to a particular [external optimization platform (EOP)] *EOP* selected from a plurality of [available] EOPs in accordance with said *associated* profile, wherein said *associated* profile indicates that said data session is optimizable by said *particular* EOP.

17. The method of claim 15, wherein said steering comprises:

steering said data session to said destination address, starting with the initial packet of said data session, wherein said *associated* profile does not indicate that said data session is optimizable by an EOP.

18. The method of claim 15, *further* comprising:

inspecting a multiplicity of packets from said data session by said DPI utility;

determining whether or not said data session is optimizable; and associating said RAS with an appropriate EOP in said associated profile.

19. The method of claim 15, *further* comprising:

[if] *when* said RAS was not found by said [looking] *look* up, [then] adding a record to said RAS database for said RAS, based on results of deep packet inspection of a group of packets of said data session that comprises at least said initial packet of said data session.

20. The method of claim 15, *further* comprising:

initializing said RAS database with a list of known RASs with [their] associated [said] profiles prior to a first operation [of] of deep packet inspection of said initial packet by said DPI utility.

*21. A method comprising:*

*storing, in a database an associated profile for each of a plurality of remote application servers;*

*inspecting a first packet of a data session with a deep packet inspection utility to ascertain an indication of a destination remote application server of the plurality of remote application servers;*

*determining from the first packet a remote application server addressing information;*

*identifying a destination address for the destination remote application server from the first packet;*

*looking up the destination remote application server in the database based on the identified destination address;*

*performing, by the deep packet inspection utility, deep packet inspection on a group of multiple subsequent packets that follow the first packet;*

*steering the data session in accordance with the associated profile of the destination remote application server stored in the database, the steering comprising starting with the first packet of the data session based on predicting the data session is suitable for processing by a first external optimization platform, wherein the predicting takes into account historical session data of the associated profiles, wherein the steering comprises steering the data session to the first external optimization platform via a route that excludes any proxy server and without terminating the data session, wherein when the destination remote access server is found in the database, and if the associated profile in the database indicates that traffic intended for the destination remote access server is optimizable, steering the data session to the first external optimization platform based on the associated profile in the database, wherein when the destination remote access server is found in the database, and if the associated profile in the database indicates that traffic intended for said destination remote access server is not optimizable, steering said data session directly to the destination remote access server;*

*when the destination remote access server was not found in the database, adding a new record in the database*

*with an associated profile per the remote access server addressing information; and*

*utilizing, by the first external optimization platform, content of the first packet of the data session to perform optimization of the data session,*

*wherein the method performs decoupling between (i) traffic classification and (ii) traffic steering.*

*22. The method of claim 21, wherein the inspecting the first packet of the data session comprises performing deep packet inspection of the first packet of the data session passing through a gateway.*

*23. The method of claim 22, wherein the gateway is an Internet service gateway.*

*24. The method of claim 21, wherein the associated profile comprises an indication that data traffic associated with the destination remote application server is optimizable.*

*25. The method of claim 21, wherein the associated profile comprises an indication of which external optimization platform, out of a plurality of external optimization platforms, to steer the data session to for optimization.*

*26. A method comprising:*

*storing, in a database an associated profile for each of a plurality of remote application servers;*

*inspecting a first packet of a data session with a deep packet inspection utility to ascertain an indication of a destination remote application server of the plurality of remote application servers;*

*determining from the first packet a remote application server addressing information;*

*identifying a destination address for the destination remote application server from the first packet;*

*looking up the destination remote application server in the database based on the identified destination address;*

*performing, by the deep packet inspection utility, deep packet inspection on a group of multiple subsequent packets that follow the first packet;*

*steering the data session in accordance with the associated profile of the destination remote application server stored in the database based on predicting, using account historical session data of the associated profiles, whether the data session is suitable for processing by a first external optimization platform via a route that excludes any proxy server, and without terminating the data session, wherein when the destination remote access server is found in the database, and if the associated profile in the database indicates that traffic intended for the destination remote access server is optimizable, steering the data session to the first external optimization platform based on the associated profile in the database, wherein when the destination remote access server is found in the database, and if the associated profile in the database indicates that traffic intended for said destination remote access server is not optimizable, steering said data session directly to the destination remote access server;*

*when the destination remote access server was not found in the database, adding a new record in the database with an associated profile per the remote access server addressing information; and*

*utilizing, by the first external optimization platform, content of the first packet of the data session to perform optimization of the data session,*

*wherein the method performs decoupling between (i) traffic classification and (ii) traffic steering.*

* * * * *